Dec. 21, 1954  C. ANSCHUTZ  2,697,442
DEVICE FOR UNLOADING OIL BARGES
Filed Oct. 15, 1952  2 Sheets-Sheet 1
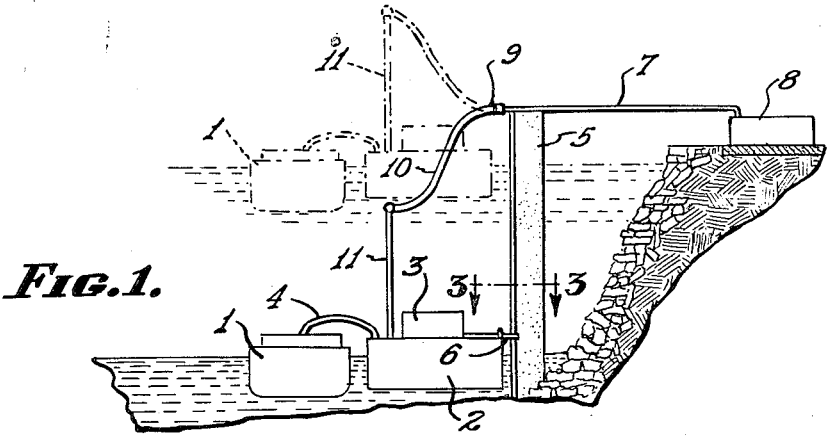
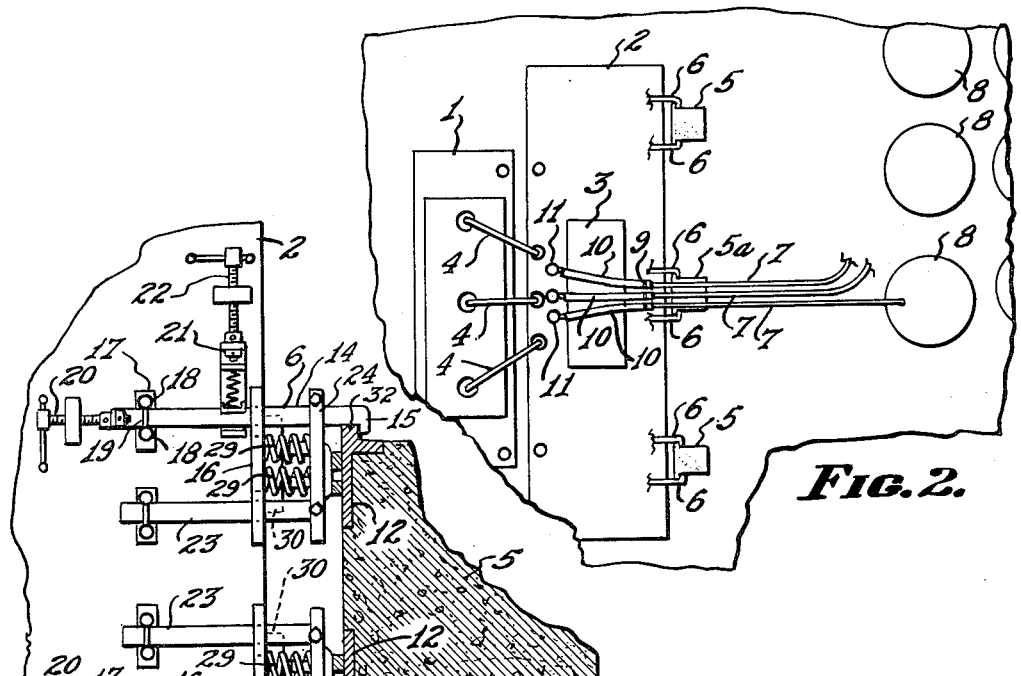
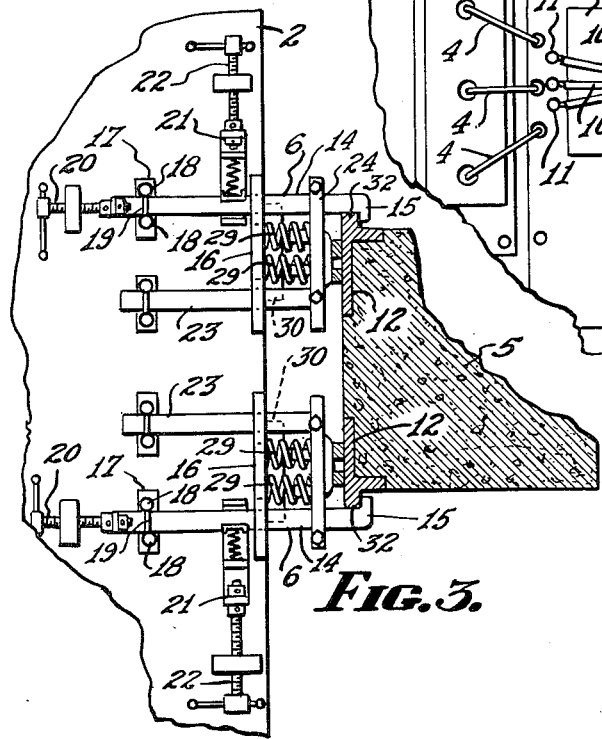
INVENTOR.
CHARLES ANSCHUTZ,
BY Allen & Allen
ATTORNEYS.

Dec. 21, 1954
C. ANSCHUTZ
2,697,442
DEVICE FOR UNLOADING OIL BARGES
Filed Oct. 15, 1952
2 Sheets-Sheet 2
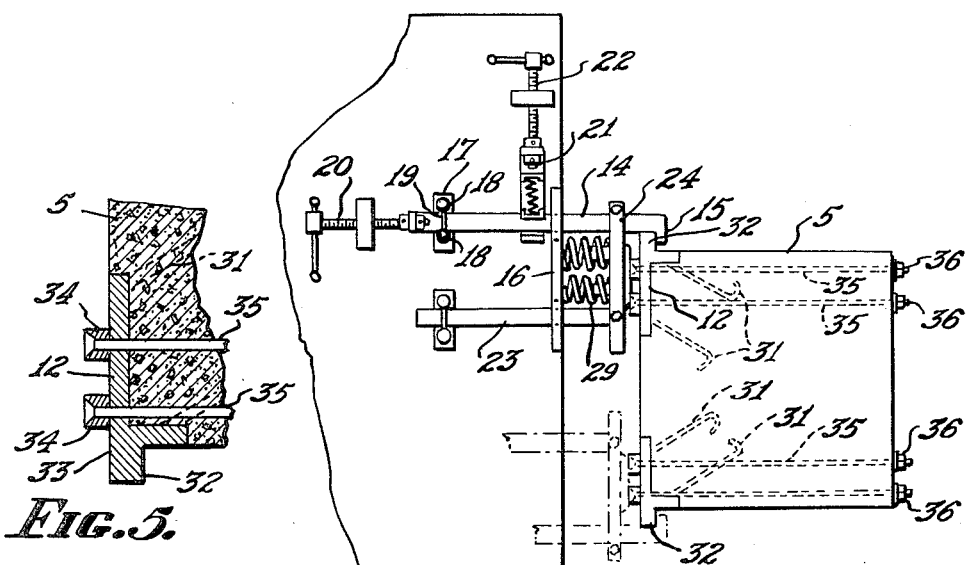
FIG. 4.
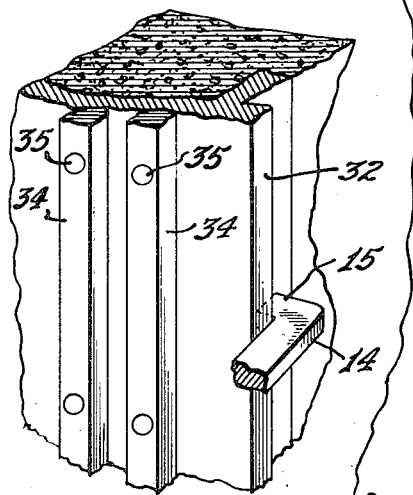
FIG. 5.
FIG. 6.
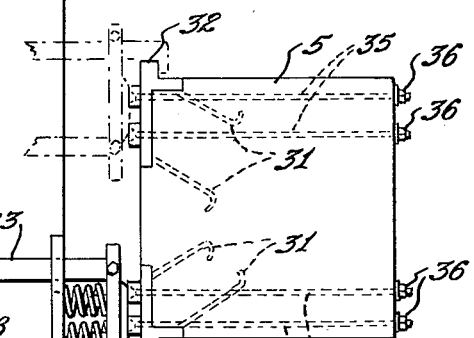
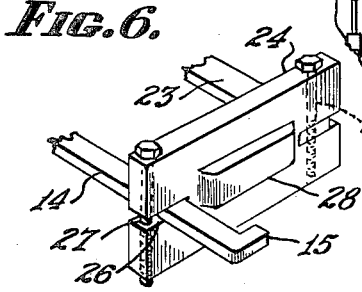
FIG. 7.
INVENTOR.
CHARLES ANSCHUTZ,
BY Allen & Allen
ATTORNEYS.

United States Patent Office 2,697,442
Patented Dec. 21, 1954

2,697,442

DEVICE FOR UNLOADING OIL BARGES

Charles Anschutz, Dayton, Ky.

Application October 15, 1952, Serial No. 314,913

5 Claims. (Cl. 137—235)

My invention relates to a device for unloading barges, and more particularly to a device for unloading barges containing oil, gasoline and the like.

My invention finds particular utility for use in river installations wherein relatively rapid rises and falls are encountered in the depth of the river. Where such rises and falls are encountered, the river-man has the problem of constantly changing the mooring lines securing the barges to the shore, and also in changing the hose or pipe connections between the barges being unloaded and the storage tanks located on shore to which the liquid cargo is to be transferred.

The current practice in unloading oil barges is to provide an unloading or pump barge which is a permanent part of the unloading installation and to which the oil or gasoline carrying tow barges are secured to discharge their cargo. The unloading barge carries pumps for pumping the cargo from the tow barge to storage tanks forming a part of the shore installation. Of course, as indicated above, the position of the unloading barge must be changed with each appreciable rise or fall in the depth of the river, and with each rise or fall in the river the supply lines extending from the unloading barge to the shore installation must be changed. This results in the loss of many man hours of labor in making the necessary changes as well as loss in pumping time. For example, in one river installation of which I am aware, seven separate sets of connections are provided extending up the river bank at spaced intervals for the selective attachment of the supply lines extending from the unloading barge. The connections on the bank lead to the storage tanks which may be an appreciable distance away. With this arrangement, all of the connections will be exposed when the river is at its lowest level, and the supply lines from the unloading barge will be connected to the lowermost one of the connections. As the river rises, one or more of the connections will be covered by the rising water, and the supply lines will then be connected to the connection next above the level of the water. It will be evident that an arrangement such as this will require numerous changes in the supply lines where the river is rising rapidly, for example, as it usually does during the period of spring rains.

It is, therefore, a principal object of my invention to provide an unloading device which will eliminate entirely the difficulties enumerated above by providing an unloading barge having supply lines which are at all times connected to a single set of connections leading to the storage tanks and wherein the adjustment of the unloading barge will be made automatically in accordance with the rise and fall of the river.

It is a further object of my invention to eliminate all labor involved in the handling of the unloading barge by doing away with mooring lines, crabs, spars, chains and the like usually employed as mooring means.

It is a further object of my invention to provide an unloading device comprising an unloading barge and a plurality of vertically extending piers to which the unloading barge is secured for sliding movement therealong.

Still a further object of my invention is the provision of permanent supply lines extending between the unloading barge and the shore installation which will require no adjustment or handling irrespective of the rise or fall of the river.

These and other objects of my invention which will be apparent hereinafter or which will be apparent to the skilled worker in the art upon reading these specifications, I accomplish by that construction and arrangement of parts of which I shall now describe an exemplary embodiment.

Reference is made to the accompanying drawings wherein:

Figure 1 is an elevational view illustrating the general arrangement of an unloading device in accordance with my invention.

Figure 2 is a partial plan view of the unloading device illustrated in Figure 1.

Figure 3 is a sectional view taken along the line 3—3 of Figure 1.

Figure 4 is a partial elevational view illustrating the manner in which the unloading barge is secured to the vertically extending concrete piers.

Figure 5 is a fragmentary sectional view illustrating the guide members carried by the piers and along which the barge is adapted to slide.

Figure 6 is a partial perspective view illustrating the guide member shown in Figure 5 as well as the arm of a clamping member carried by the unloading barge.

Figure 7 is a partial perspective view of the clamping arm and related parts of one of the clamping members.

While in the description which follows, I shall describe my invention as it applies to the unloading of oil from river tow barges, it should be understood that my invention is equally applicable to the loading of barges, as well as to the loading and unloading of vessels other than barges and the invention is in no sense intended to be limited to river installations, but rather is applicable to any situation wherein changes in the water level are encountered.

For an understanding of the general operation of my invention, reference is made to Figures 1 and 2 of the drawings wherein the reference numeral 1 indicates a loaded oil barge tied to an unloading barge 2. A pump house 3 located on the deck of the unloading barge 2 will contain pumping mechanism for pumping the oil from the river barge through suitable hose connections 4.

The unloading barge is anchored to a plurality of vertically extending piers 5 forming a part of the shore installation by means of clamping devices 6. One of the piers 5, preferably an intermediate pier, such as the pier 5a, supports one or more supply lines 7 which extend from the top of the pier to storage tanks 8 located on the river bank above the high water level. The supply lines 7 terminate at or slightly beyond the pier 5a in fittings 9 to which are connected flexible hoses 10. These flexible hoses 10 are connected at their opposite ends to vertically extending feed pipes 11 extending upwardly from the deck of the unloading barge. Thus, oil pumped from the river barge through the hose connections 4 will be pumped through the feed pipes 11, the flexible hoses 10 and the supply lines 7 to the storage tanks on the river bank.

The piers 5 to which the unloading barge is secured are positioned off-shore a distance sufficient to permit them to be contacted by the unloading barge at the low water level, and they have a height which is somewhat greater than the depth of the river at the high water mark. The number of piers employed will be governed by the length of the unloading barge and the condition of the river at a given installation. However, there will generally be at least three such piers spaced apart in the manner illustrated.

As already indicated, the unloading barge is adapted to move vertically along the piers with changes in the height of the river. To this end, guide means are provided on the piers and clamping means are provided on the unloading barge for engagement with the guide means to slidably secure the unloading barge to the piers. Reference is now made to Figure 3 of the drawings wherein the pier 5 is provided with guide members 12 at the front corners thereof for engagement by the clamping devices 6 carried on the unloading barge. In the embodiment illustrated, one of the clamping devices 6 is provided for engagement with each side edge of the pier, the clamping devices being arranged in cooperating pairs. However, it will be understood that where the circumstances warrant it, a single clamping device may be used with each of the piers, the clamping devices being arranged in the manner illustrated in Figure 4 of the drawings. Even with this arrangement, however, the clamping devices work in pairs to maintain the unloading barge in proper contact with the piers.

Each of the clamping devices constitutes a clamping arm 14 having an inturned projection 15 on the end thereof for contact with the guide member 12. The clamping arm 14 is supported on the unloading barge by means of a supporting plate 16 and a rest 17 on which the opposite end of the clamping arm is supported between spaced pins 18 and beneath rod 19 extending between the spaced pin. The clamping arm is adjustable axially by means of the threaded screw element 20. The clamping arm is pivoted outwardly to disengage it from the guide member 12 by means of a spring pressed adjustment member 21 having threaded adjustment screw element 22. A second arm 23 is also supported by the supporting plate 16. A pressure plate 24 extends between the clamping arm 14 and the outer end of arm 23 for contact with the front surface of the guide member 12. As best seen in Figure 7, the pressure plate 24 is pivoted to arm 23 by means of a pin 25, whereas the clamping arm 14 is slidably mounted in a slot 26 and prevented from being withdrawn from the slot by means of a pin 27. The pressure plate 24 has a projection 28 on the outer surface thereof for contact with the guide member. Coil springs 29 extend between the supporting plate 16 and the pressure plate 24 to exert outwardly directed pressure against the plate 24. An abutment 30, as shown in Figure 3, lies beneath the springs 29 to maintain them in position against supporting plate 16. For further details of the construction of the clamping device just described, reference is made to my copending application Serial No. 331,048, filed January 13, 1953, and entitled Clamping Device.

Referring now to Figures 4, 5 and 6 of the drawings, the guide members 12 are set in opposite corners of the piers 5 and are anchored to the piers by means of rods 31 embedded in the piers. The guide members have projecting edges 32 about which the inturned projections 15 of the clamping arms are engaged. The face 33 of each of the guide members is preferably provided with one or more rails 34 projecting outwardly from the guide member and adapted to be contacted by the projection 28 carried by the pressure plate 24. This arrangement facilitates sliding movement of the pressure plate along the guide member. As best seen in Figures 4 and 5, the rails 34 are supported by tie rods 35 extending through the piers 5 and bolted to the opposite sides thereof, as at 36. Of course, the rails 34 may be connected in other ways which will be apparent to the skilled worker in the art. However, I find that it is desirable to provide a ready means for the replacement of the rails 34 since they are subject to considerable wear.

It should now be apparent that the clamping devices will permit the barge to slide along the guide members 12 as the river rises and falls, and yet the construction of the clamping devices and the manner in which they are engaged with the piers is such that twisting or turning of the barge both longitudinally and laterally of the piers is prevented. Furthermore, the spring elements incorporated in the clamping devices, particularly the springs 29, act to absorb shock.

Referring again to Figures 1 and 2 of the drawings, it will be evident that as the unloading barge slides vertically along the piers, the flexible hoses 10 connecting the supply lines 7 and the feed pipes 11 must be of a length such that the connection will be effective irrespective of the vertical position of the barge. I have found that the most effective arrangement is to make the upstanding pipes 11 carried by the unloading barge of a length substantially equal to one-half the distance between the fittings 9 at the top of the pier 5a and the deck of the unloading barge when the unloading barge is at its lowermost position relative to the piers. I have found where this relationship exists, a hose 10 which will just nicely connect the feed pipe 11 to the fittings 9 when the barge is in its lowermost position will loop downwardly but will not interfere with normal activity on the pump barge when the barge has risen to a position wherein the tops of the feed pipes 11 lie at the height of the fittings 9. When, as illustrated in dotted lines in Figure 1, the barge rises to the high water level, the hose 10 will again be extended, but since the fittings 9 are at the top of the pier where they are above the high water level, the effective distance between the tops of the feed pipes 11 and the fittings 9 will be equal to or somewhat less than the distance between them at the low water level and consequently no change will be required in the hoses 10. Thus at no time will there be any necessity to change the hose connections, the only movement being in the hoses themselves as they are looped and unlooped by the vertical movement of the feed pipes 11 relative to the fittings 9.

In addition to providing a permanent and completely automatically adjusting mooring for the unloading barge or pump boat, my construction is also advantageous in that drift which, in an ordinary installation, works its way between the river bank and the unloading barge causing delay in the moving of the unloading barge, presents no problem where the vertical piers and guide means for the pump boat are provided as taught herein. Also, the piers make a very safe ice harbor.

Modifications may, of course, be made in my invention without departing from the spirit of it.

Having described my invention in an exemplary embodiment, what I desire to secure and protect by Letters Patent is:

1. In apparatus for unloading oil barges, the combination in a permanent off-shore installation of a pump barge, a plurality of piers rising from the bed of the body of water in which said pump barge is floating and positioned to be contacted by said pump barge, said piers including vertically disposed guide members along which said pump barge is adapted to slide, mooring means for slidably connecting said pump barge to said guide members for automatic movement therealong with changes in the level of the body of water, a fixed supply line supported at one end on one of said piers and extending to a storage tank on shore, and a flexible hose extending between the end of said supply line and the pump barge, said flexible hose being of a length to connect the supply line and the barge irrespective of the vertical position of the barge as determined by the level of the body of water.

2. In apparatus for unloading oil barges, the combination in a permanent off-shore installation of a pump barge, a plurality of piers rising from the bed of the body of water in which said pump barge is floating and positioned to be contacted by said pump barge, said piers including vertically disposed guide members along which said pump barge is adapted to slide, said guide members being of a length to be contacted by the pump barge both at the low water mark and the high water mark of the body of water, mooring means for slidably connecting said pump barge to said guide members for automatic movement therealong with changes in the level of the body of water, a fixed supply line supported at one end on one of said piers above the high water mark and extending to a storage tank on shore, and a flexible hose extending between the end of said supply line and the pump barge, said flexible hose being of a length to connect the supply line and the barge irrespective of the vertical position of the barge as determined by the level of the body of water.

3. In apparatus for unloading oil barges, the combination in a permanent off-shore installation of a pump barge, a plurality of piers rising from the bed of the body of water in which said pump barge is floating and positioned to be contacted by said pump barge, said piers including vertically disposed guide members along which said pump barge is adapted to slide, said guide members being of a length to be contacted by the pump barge both at the low water mark and the high water mark of the body of water, mooring means for slidably connecting said pump barge to said guide members for automatic movement therealong with changes in the level of the body of water, a fixed supply line supported at one end on one of said piers above the high water mark and extending to a storage tank on shore, a vertically disposed feed pipe extending upwardly from said pump barge, and a flexible hose extending between the upper end of said feed pipe and the end of said supply line, said flexible hose being of a length to connect the supply line and the barge irrespective of the vertical position of the barge as determined by the level of the body of water.

4. The apparatus claimed in claim 3 wherein said feed pipe is of a height equal to substantially one half the vertical distance between the supply line and the pump barge when the said pump barge is at the low water mark.

5. In apparatus for unloading oil barges and the like, the combination in a permanent off-shore installation of a pump barge, hose connections on said pump barge for attachment to an oil carrying tow barge to be unloaded, pumping means on said pump barge for pumping the cargo from said tow barge through said hose connection, a plurality of piers rising from the bed of the body of water in which said pump barge is floating and positioned to be contacted by said pump barge, said piers including vertically disposed guide members along which said pump barge is adapted to slide, said guide members being of a length to be contacted by the pump barge both at the low water mark and the high water mark of the body of water, mooring means for slidably connecting said pump barge to said guide members for automatic movement therealong with changes in the level of the body of water, a fixed supply line supported at one end on one of said piers above the high water mark and extending to a storage tank on shore, a vertically disposed feed pipe extending upwardly from the pump barge, and a flexible hose extending between the upper end of said feed pipe and the end of said supply line, the said flexible hose being of a length to connect the supply line and the barge irrespective of the vertical position of the barge as determined by the level of the body of water, whereby cargo pumped from said tow barge may be pumped through the feed pipe to the storage tank on shore via said flexible hose and said supply line.

References Cited in the file of this patent

UNITED STATES PATENTS

| Number | Name | Date |
|---|---|---|
| 712,215 | Titcomb | Oct. 28, 1902 |
| 1,295,626 | Snell | Feb. 25, 1919 |
| 1,708,176 | Holly | Apr. 9, 1929 |
| 2,282,978 | Meyer | May 12, 1942 |
| 2,576,143 | Rochet | Nov. 27, 1951 |